(12) United States Patent
Li et al.

(10) Patent No.: US 9,015,087 B2
(45) Date of Patent: Apr. 21, 2015

(54) METHODS, SYSTEMS, AND PRODUCTS FOR INTERFACING WITH NEUROLOGICAL AND BIOLOGICAL NETWORKS

(71) Applicants: Kevin A. Li, New York, NY (US); Troy C. Meuninck, Newnan, GA (US); Robert Raymond Miller, II, Convent Station, NJ (US); James H. Pratt, Round Rock, TX (US); Horst J. Schroeter, New Providence, NJ (US); Behzad Shahraray, Holmdel, NJ (US)

(72) Inventors: Kevin A. Li, New York, NY (US); Troy C. Meuninck, Newnan, GA (US); Robert Raymond Miller, II, Convent Station, NJ (US); James H. Pratt, Round Rock, TX (US); Horst J. Schroeter, New Providence, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 252 days.

(21) Appl. No.: 13/647,422

(22) Filed: Oct. 9, 2012

(65) Prior Publication Data

US 2014/0101084 A1    Apr. 10, 2014

(51) Int. Cl.
*G06N 3/02*    (2006.01)
*G06F 3/01*    (2006.01)
(52) U.S. Cl.
CPC ........................ *G06F 3/015* (2013.01)

(58) Field of Classification Search
None
See application file for complete search history.

(56) References Cited

U.S. PATENT DOCUMENTS

| | | | |
|---|---|---|---|
| 5,638,832 A | 6/1997 | Singer et al. | |
| 6,001,065 A | 12/1999 | DeVito | |
| 6,013,122 A | 1/2000 | Klitzman et al. | |
| 6,192,890 B1 | 2/2001 | Levy et al. | |
| 6,481,140 B1 | 11/2002 | Marshall | |
| 7,041,362 B2 | 5/2006 | Barbera-Guillem | |
| 7,344,587 B2 | 3/2008 | Khan et al. | |
| 7,435,524 B2 | 10/2008 | Anderson et al. | |
| 7,699,917 B1 | 4/2010 | Pagnotta | |
| 8,655,428 B2* | 2/2014 | Pradeep et al. | 600/383 |
| 2002/0173823 A1 | 11/2002 | English | |
| 2007/0032846 A1 | 2/2007 | Ferren et al. | |
| 2008/0009310 A1 | 1/2008 | Rhoads et al. | |
| 2008/0091118 A1* | 4/2008 | Georgopoulos | 600/544 |
| 2009/0179642 A1* | 7/2009 | deCharms | 324/309 |
| 2010/0069777 A1* | 3/2010 | Marks | 600/544 |
| 2011/0298706 A1 | 12/2011 | Mann | |
| 2012/0289869 A1* | 11/2012 | Tyler | 601/2 |
| 2013/0035579 A1* | 2/2013 | Le et al. | 600/383 |
| 2014/0005518 A1* | 1/2014 | Ko et al. | 600/409 |
| 2014/0058528 A1* | 2/2014 | Contreras-Vidal et al. | 623/25 |
| 2014/0222738 A1* | 8/2014 | Joyce et al. | 706/13 |

\* cited by examiner

*Primary Examiner* — Alan Chen
(74) *Attorney, Agent, or Firm* — Scott P. Zimmerman, PLLC

(57) ABSTRACT

Methods, systems, and products provide interfaces between intrahost networks and interhost networks within biological hosts. Neuroregional translations are performed to route communications to and from the biological hosts. Bioregional translations may also be performed to route communications to and from the biological hosts.

20 Claims, 19 Drawing Sheets

METHODS, SYSTEMS, AND PRODUCTS FOR INTERFACING WITH NEUROLOGICAL AND BIOLOGICAL NETWORKS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Neuroscience has shown that the brain is very intricate. Neuroscientists even refer to the brain as a network of interconnected neural pathways. Modern networking concepts may thus lead to an even greater understanding of neural and biological networks.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
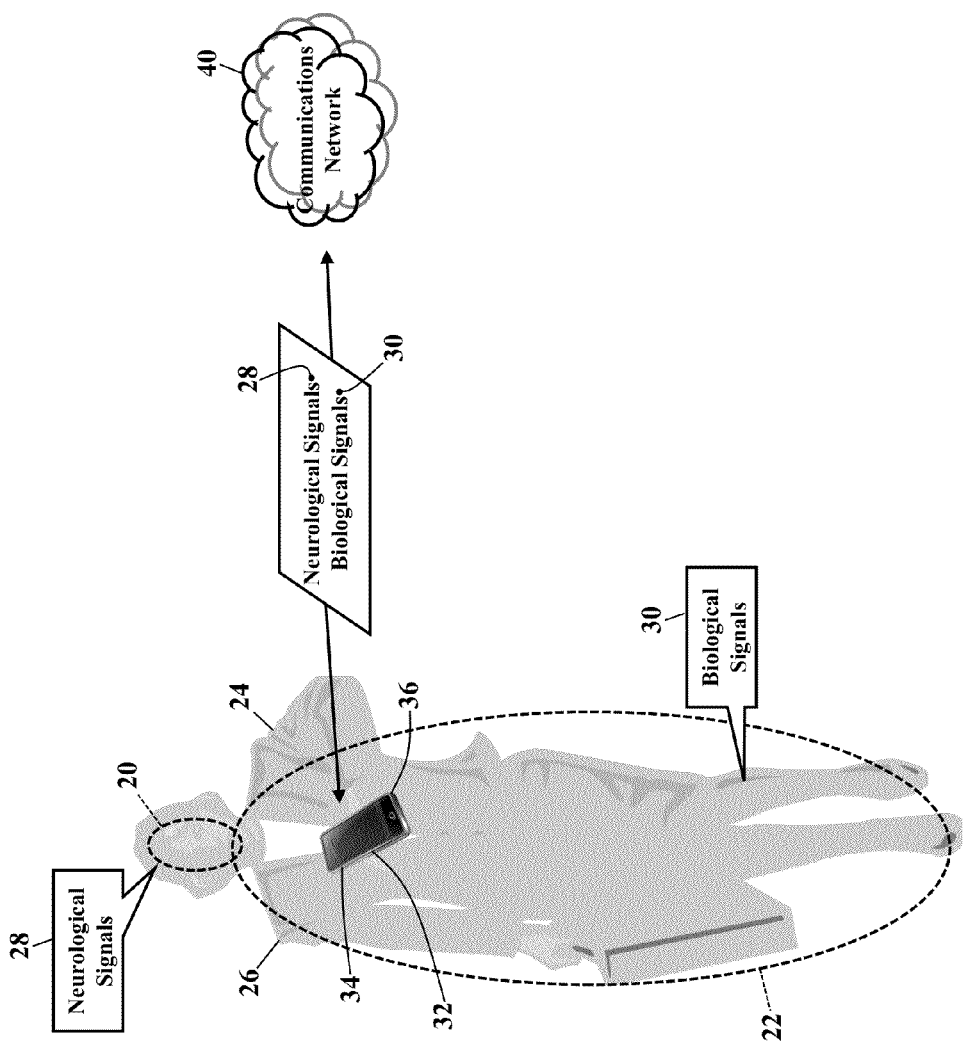
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a neurological area network 20 and a body area network 22 of a biological host 24. The biological host 24 is illustrated as a human woman 26, but the biological host 24 may be any animal or other living organism. Whatever the biological host 24, science has shown that electrical signals are transmitted throughout the brain and body. Neuroscientists, for example, have shown that neurological signals 28 are transmitted along the neurological area network 20 in the brain. Medical science has also shown that biological signals 30 are transmitted throughout the body of the biological host 24. The biological signals 30, for example, are transmitted between the tissue, cells, organs, and nervous system in the biological host 24. As science continues to advance, the brain can be considered its own separate network (hence the neurological area network 20) that sends and receives the neurological signals 28. The body, too, may be considered its own separate body area network 22 that sends and receives the biological signals 30.

Exemplary embodiments provide an interface 32 between these separate networks. The interface 32 is illustrated as a communications device 34, such as a smart phone 36. The interface 32, though, may be any processor-controlled device (as later paragraphs will explain). As the woman 26 carries, wears, or uses the communications device 34, the communications device 34 communicates with the neurological area network 20 and the body area network 22. That is, the communications device 34 is capable of receiving and interpreting the neurological signals 28 that are transmitted from or along the neurological area network 20 in the woman's brain. The communications device 34 is also capable of receiving and interpreting the biological signals 30 that are transmitted from or along the woman's body area network 22. The communications device 34 thus provides the interface 32 between these two separate networks.

Exemplary embodiments, however, also interface with an external communications network 40. As most readers know, the communications device 34 also communicates with a wireless network, such as a cellular network and/or a WI-FI® network. The communications device 34 may wirelessly send signals to, and wirelessly receive signals from, the communications network 40. Web pages, music, movies, and any other data may be routed to the woman's communications device 34. So, as the woman 26 carries her communications device 34, she can send and receive data.

Exemplary embodiments thus provide the interface 32 between the different networks. The communications device 34 may receive the neurological signals 28 from the neurological area network 20 in the woman's brain. The communications device 34 may then forward or route those neurological signals 28 to the external communications network 40. The woman's neurological signals 28 may thus be transmitted and sent into a cellular data network and/or a WI-FI® network for routing to some distant destination for analysis. The woman's communications device 34 may also receive signals from the external communications network 40 that are destined for her neurological area network 20. The communications device 34, likewise, may receive the biological signals 30 from the body area network 22 and send those biological signals 30 into the external communications network 40. The woman's communications device 34 may also receive signals from the external communications network 40 that are destined for her body area network 22. Exemplary embodiments thus provide the interface 32 between the neurological area network 20 in the woman's brain, the body area network 22 in the woman's body, and the external communications network 40.

Exemplary embodiments also describe nested communications. The neurological area network 20, the body area network 22, and the external communications network 40 may have a nested arrangement based on frequency. Science has shown that the human brain processes the neurological signals 28 at an extremely high frequency. Indeed, the brain's frequency may be much too high for economical transmission into the external communications network 40. The biological signals 30 in the body area network 22 are a lower frequency, but the biological signals 30 may still be of too high frequency for the external communications network 40. The woman's communications device 34, then, may transform the neurological signals 28 and/or the biological signals 30 to be compatible with the external communications network 40 (which later paragraphs will explain).

Figure 2:
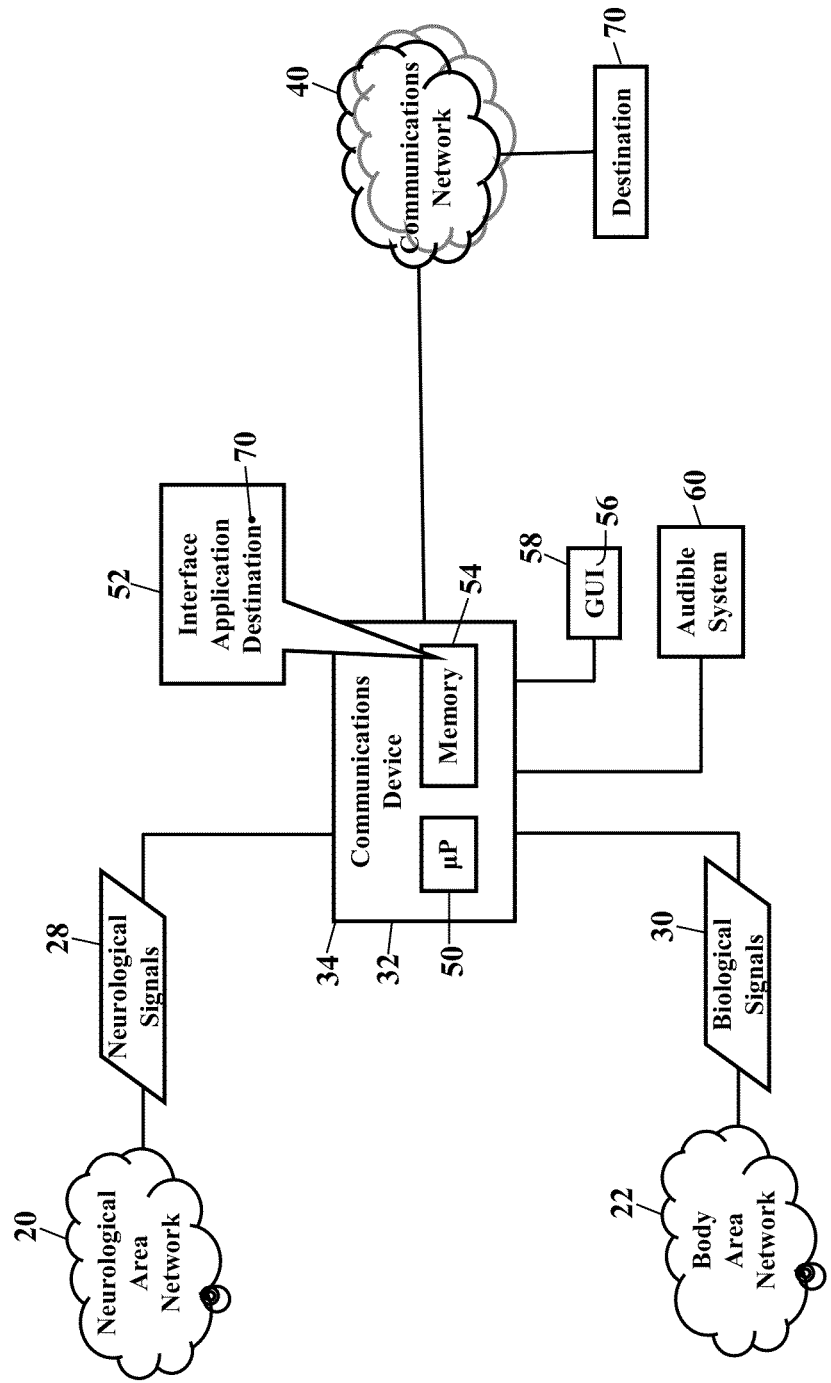
FIG. 2 is a more detailed schematic illustrating an operating environment, according to exemplary embodiments.

FIG. 2 is a more detailed schematic illustrating an operating environment, according to exemplary embodiments. Here the communications device 34 again provides the interface 32 between the neurological area network 20 in the brain, the body area network 22 in the body, and the external communications network 40. The communications device 34 may have a processor 50 (e.g., "µP"), application specific integrated circuit (ASIC), or other component that executes an interface application 52 stored in a local memory 54. The interface application 52 may instruct the processor 50 to generate and visually display a user interface 56 on a display device 58. The interface application 52 may also instruct the processor 50 to generate and present audible content from a speaker or other audible system 60. The communications device 34 receives the neurological signals 28 from the neurological area network 20. The communications device 34 may have any physical or wireless interface to the neurological area network 20, such as contacts, electrodes, and any other physiological sensor. The communications device 34 may also receive the biological signals 30 from the body area network 22. The communications device 34, likewise, may have any physical or wireless interface to the body area network 22, such as contacts, electrodes, and any other physiological sensor. The interface application 52 includes instructions, code, and/or programs that cause the processor 50 to determine a destination 70 for the neurological signals 28 and the biological signals 30.

The destination 70 likely requires routing into the communications network 40. The brain and the body already have one or more electrical connections. The central nervous system, for example, already provides an extremely fast "pipe" for electrical signals transmitted between the brain and the body. Unless some significant breakthrough is made, it is unlikely that the communications device 34 could provide a faster routing process than the central nervous system. For the foreseeable future, then, the destination 70 will most likely be outside the biological host 24. That is, the destination 70 will likely be outside the neurological area network 20 and outside body area network 22. The destination 70 will thus require routing into and through the external communications network 40. So, the interface application 52 instructs the processor 50 to route the neurological signals 28 and/or the biological signals 30 along the communications network 40 to their destination 70.

Exemplary embodiments may be applied regardless of networking environment. As the above paragraphs mentioned, the communications network 40 may be a wireless network having cellular, WI-FI®, and/or BLUETOOTH® capability. The communications network 40, however, may be a cable network operating in the radio-frequency domain and/or the Internet Protocol (IP) domain. The communications network 40, however, may also include a distributed computing network, such as the Internet (sometimes alternatively known as the "World Wide Web"), an intranet, a local-area network (LAN), and/or a wide-area network (WAN). The communications network 40 may include coaxial cables, copper wires, fiber optic lines, and/or hybrid-coaxial lines. The communications network 40 may even include wireless portions utilizing any portion of the electromagnetic spectrum and any signaling standard (such as the IEEE 802 family of standards, GSM/CDMA/TDMA or any cellular standard, and/or the ISM band). The communications network 40 may even include powerline portions, in which signals are communicated via electrical wiring. The concepts described herein may be applied to any wireless/wireline communications network, regardless of physical componentry, physical configuration, or communications standard(s).

Figure 3:
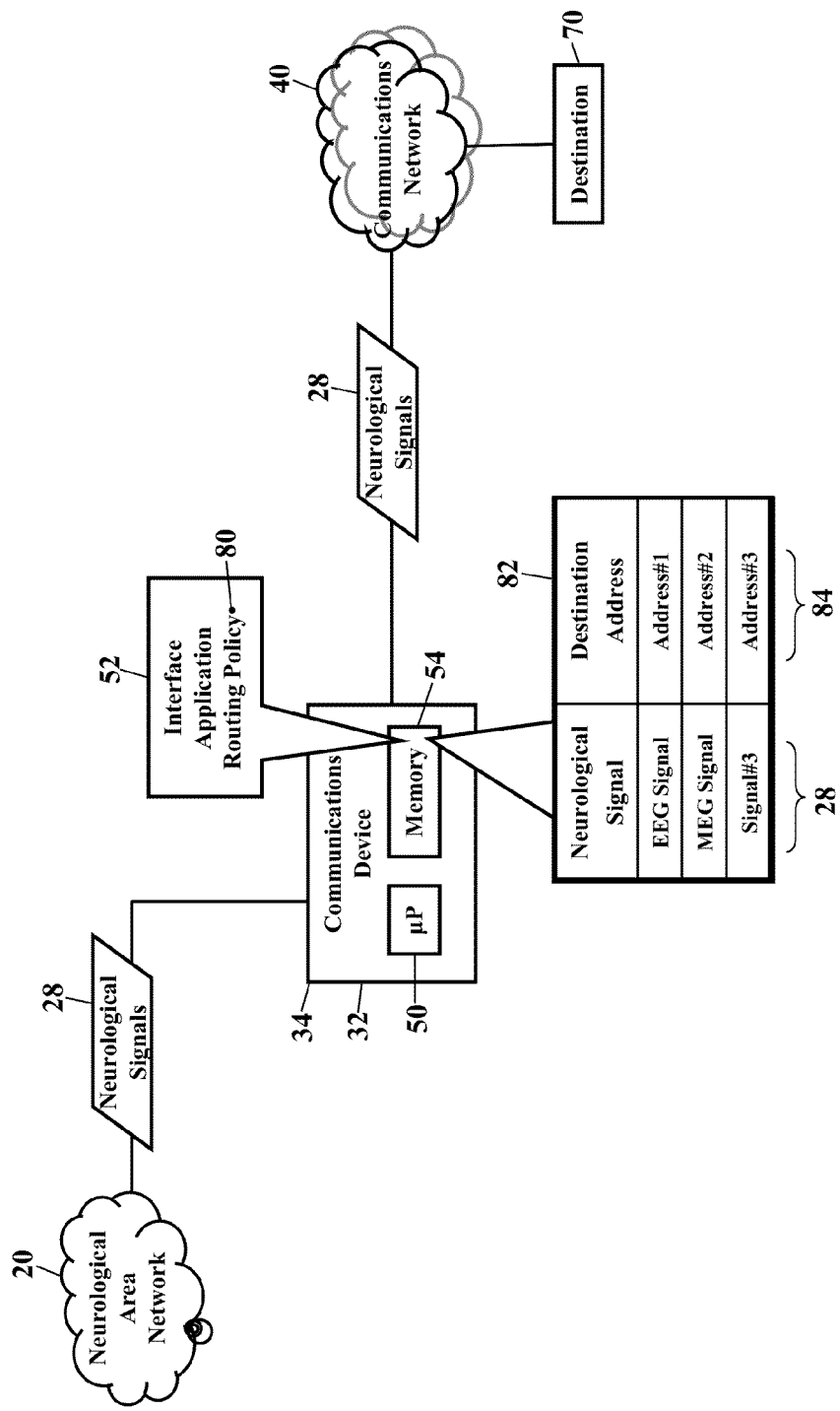
FIGS. 3-4 are schematics illustrating routing of neurological signals, according to exemplary embodiments.

FIG. 3 is a schematic illustrating routing of the neurological signals 28, according to exemplary embodiments. Here the communications device 34 provides a connection interface between the neurological area network 20 and the external communications network 40. When the communications device 34 receives the neurological signals 28 from the neurological area network 20, the interface application 52 implements one or more routing policies 80 that determine the destination 70 of the neurological signals 28. Each routing policy 80 is stored in the memory 54 of the communications device 34. FIG. 3, for simplicity, illustrates the routing policy 80 as a routing table 82 that maps, relates, or associates different neurological signals 28 to different destination addresses 84 within the communications network 40. The interface application 52 queries the table 82 for the neurological signal 28 received from the neurological area network 20. The interface application 52 receives the corresponding destination address 84 in response. The interface application 52 then instructs the processor 50 to forward or route the neurological signal 28 to the destination address 84 associated with the destination 70.

As FIG. 3 illustrates, there may be different types of neurological signals 28. Different regions or portions of the brain may produce different neurological signals 28. There may also be different scientific processes that obtain different neurological signals 28. Electroencephalogram ("EEG") and magnetoencephalogram ("MEG"), for example, are two different neurological signals 28 that may be received from the brain. Each different neurological signal 28 may thus have a different destination address 84, depending on the type of signal and/or the region of the brain. Exemplary embodiments may thus retrieve the routing policy 80 that specifies the destination address 84 for the neurological signals 28. The interface application 52 then instructs the processor 50 to direct the neurological signal 28 to the retrieved destination address 84. The smart phone (illustrated as reference numeral 36 in FIG. 1), for example, may then wirelessly transmit the neurological signal 28 to the communications network 40. Network components within the communications network 40 then route the neurological signal 28 to the network destination address 84.

Figure 4:
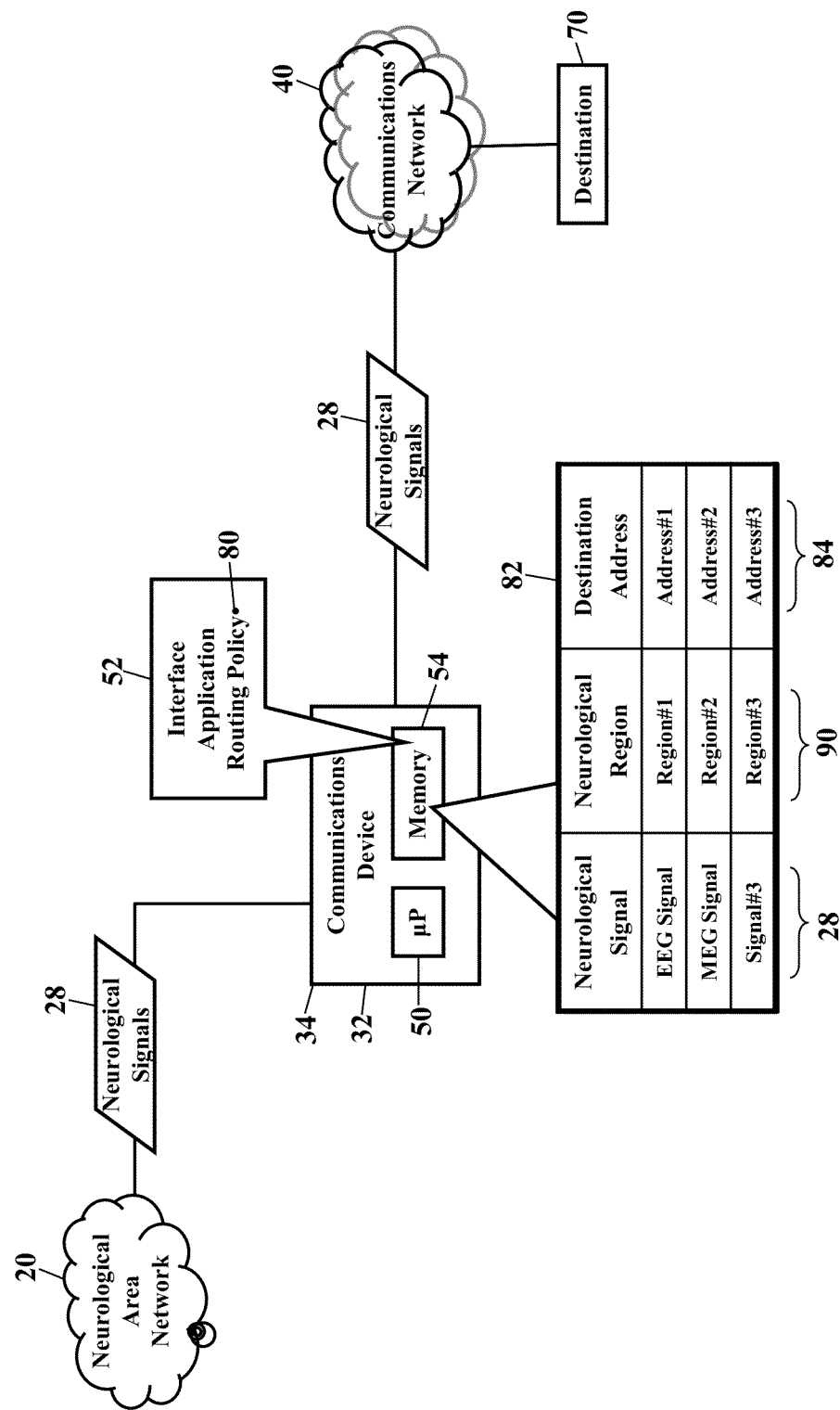

FIG. 4 is another schematic illustrating routing of the neurological signals 28, according to exemplary embodiments. Here the neurological signals 28 may be identified and routed according to location in the brain. As the above paragraphs explained, different regions or portions of the brain may produce different neurological signals 28. Exemplary embodiments may thus differentiate or distinguish between regions of the brain and the neurological signals 28 that originate from a particular region of the brain. Exemplary embodiments, in other words, may select the destination 70 based on the particular region of the brain.

FIG. 4 thus illustrates neuroregional translations. Each neurological signal 28 may be received from, or identified with, a different neurological region 90 within the neurological area network 20. Studies show that different regions of the brain are used for different processes and tasks (e.g., "right-brain" and "left brain" activities). When the communications device 34 receives the neurological signal 28, the neurological signal 28 may be identified with a particular neurological region 90 within the neurological area network 20. The neurological signal 28 may thus be mapped to its corresponding destination address 84 in the communications network 40, based on the neurological region 90. Once the network destination address 84 is selected, the interface application 52 then instructs the processor 50 to direct the neurological signal 28 to the retrieved destination address 84.

Figure 5:
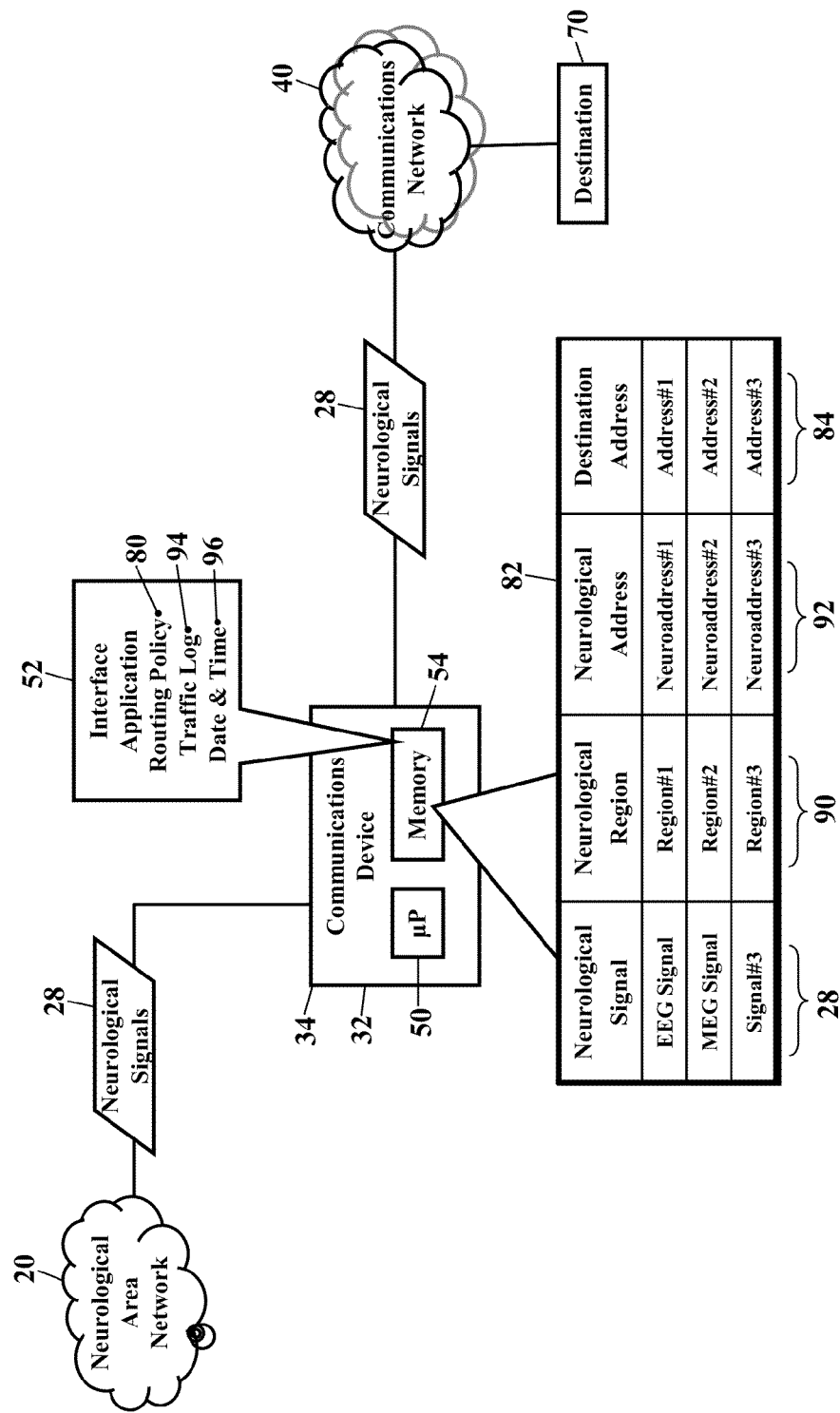
FIG. 5 is a schematic illustrating neuroregional translations, according to exemplary embodiments.

FIG. 5 is another schematic illustrating neuroregional translations, according to exemplary embodiments. Here different neurological addresses 92 may be assigned to the different neurological regions 90 within the neurological area network 20. The routing policy 80, in other words, may assign network addresses to the different neurological regions 90 within the neurological area network 20. Each different neurological region 90 may thus be addressable to send/receive communications to/from the communications network 40. When the communications device 34 receives the neurological signal 28, the neurological signal 28 may again be identified with its particular neurological region 90 within the neurological area network 20. Once the neurological region 90 is known, the interface application 52 consults the routing table 82 for the corresponding neurological address 92 assigned to the neurological region 90. The interface application 52 may then query for the corresponding destination address 84 in the communications network 40, based on the neurological region 90 and/or the neurological address 92. The interface application 52 may then log the neurological signal 28 in a traffic log 84, using a date and time 96 of receipt, the origination neurological address 92 (e.g., the neurological region 90), and the destination address 84. Once the network destination address 84 is selected, the interface application 52 then instructs the processor 50 to direct the neurological signal 28 to the retrieved destination address 84.

Figure 6:
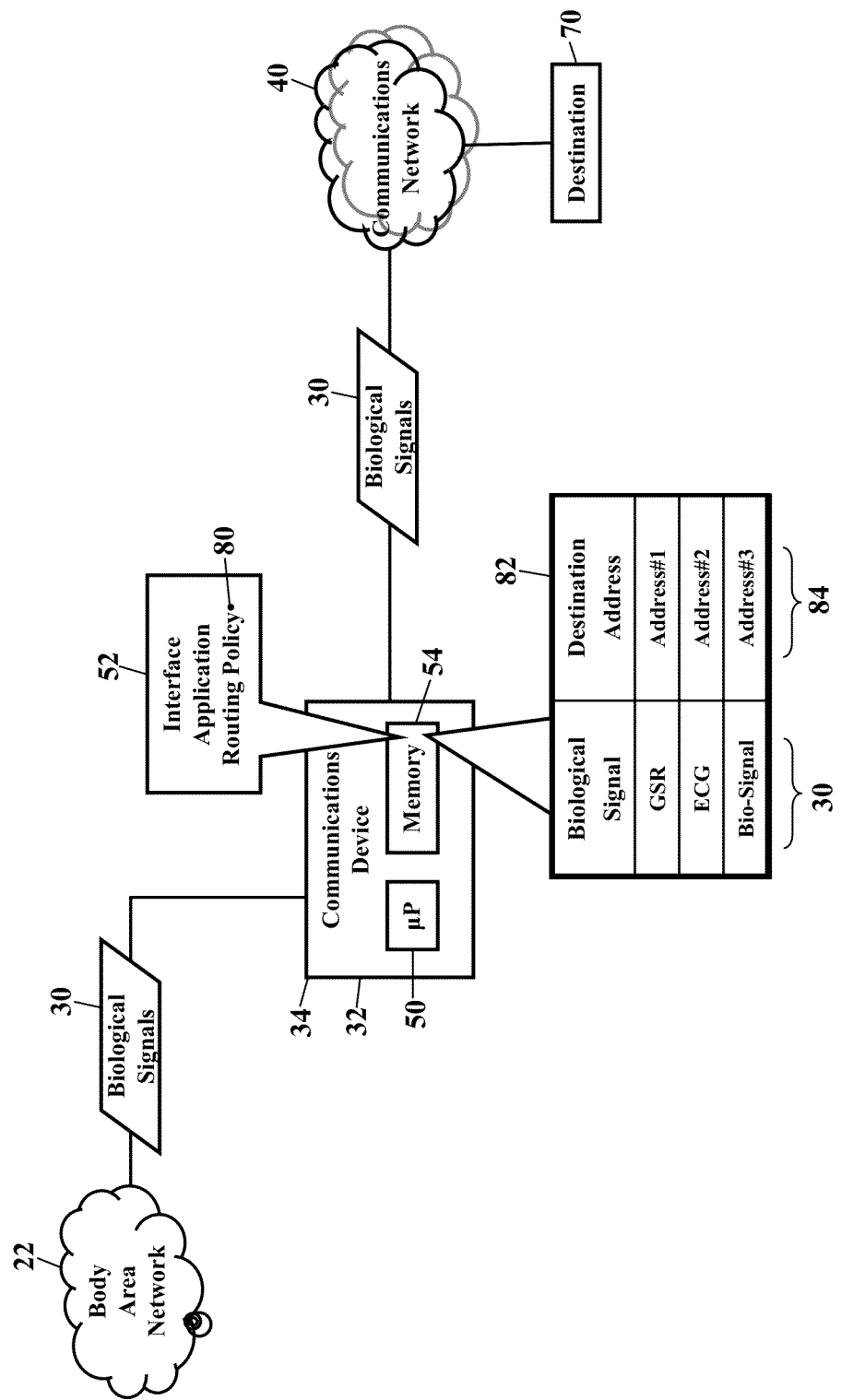
FIGS. 6-7 are schematics illustrating routing of biological signals, according to exemplary embodiments.

FIG. 6 is a schematic illustrating routing of the biological signals 30, according to exemplary embodiments. Here the communications device 34 provides a connection interface between the body area network 22 and the external communications network 40. When the communications device 34 receives the biological signal 30 from the body area network 22, the interface application 52 again implements the routing policy 80 for the biological signals 30. The routing policy 80 determines the network destination address 84 in the communications network 40. The interface application 52 queries the table 82 for the biological signal 30 received from the body area network 22. The interface application 52 receives the corresponding destination address 84 in response. The interface application 52 then instructs the processor 50 to forward or route the biological signal 30 to the destination address 84.

As FIG. 6 illustrates, there may also be different types of biological signals 30. There are many different scientific processes that obtain different biological signals 30. Galvanic skin response (or "GSR"), electrocardiogram ("ECG"), electromyogram ("EMG"), and heart rate variability ("HRV") may be received as the biological signal 30. Each different biological signal 30 may thus have a different destination address 84, depending on the type of signal. Exemplary embodiments may thus retrieve the routing policy 80 that specifies the destination address 84 for the biological signal 30. The interface application 52 then instructs the processor 50 to direct the biological signal 30 to the retrieved destination address 84. The smart phone (illustrated as reference numeral 36 in FIG. 1), for example, may then wirelessly transmit the biological signal 30 to the communications network 40. Network components within the communications network 40 then route the biological signal 30 to the network destination address 84.

Figure 7:
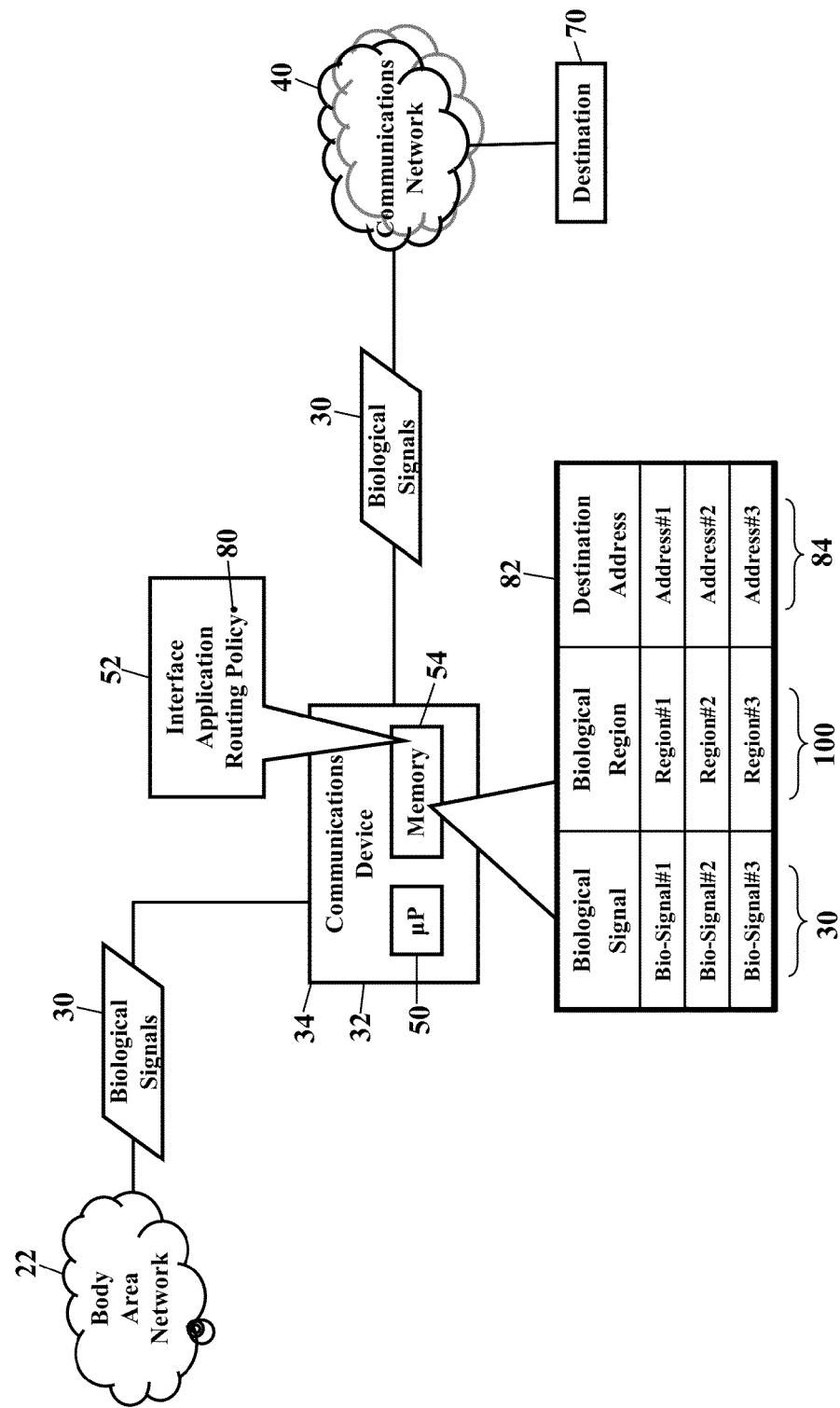

FIG. 7 is another schematic illustrating routing of the biological signal 30, according to exemplary embodiments. Here the biological signal 30 may be identified and routed according to location in the body. Different regions or portions of the body may produce different biological signal 30. Exemplary embodiments may thus differentiate or distinguish between regions of the body and the biological signal 30 that originate from a particular region of the body. Exemplary embodiments, in other words, may select the destination 70 based on the particular region of the body from which the biological signal 30 originates.

FIG. 7 thus illustrates bioregional translations. Each biological signal 30 may be received from, or identified with, a different biological region 100 within the body area network 22. Some biological signal 30 may originate from, or be identified with, an arm, while others are identified with a leg. Granularity may even be finer, thus identifying biological signals 30 from a hand, finger, toe, or even a cell. Regardless, when the communications device 34 receives the biological signal 30, the biological signal 30 may be identified with, or contain information identifying, the biological region 100 within the body area network 22. The interface application 52 queries the routing policy 80 for the corresponding destination address 84 in the communications network 40, based on the biological region 100. Once the destination address 84 is selected, the interface application 52 then instructs the processor 50 to direct the biological signal 30 to the retrieved destination address 84.

Figure 8:
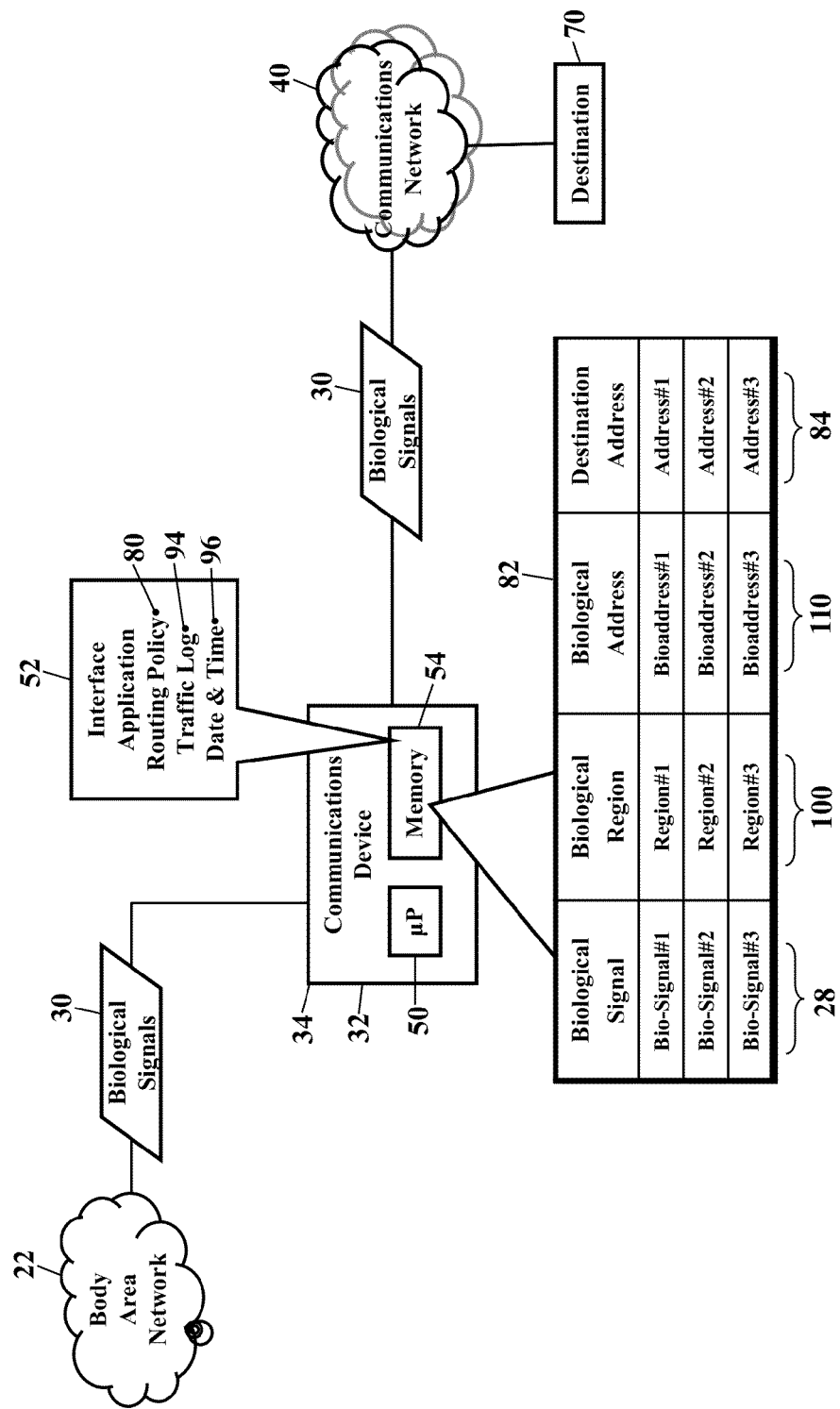
FIG. 8 is a schematic illustrating bioregional translations, according to exemplary embodiments.

FIG. 8 is another schematic illustrating bioregional translations, according to exemplary embodiments. Because the biological signal 30 may be associated with its corresponding biological region 100 within the body area network 22, exemplary embodiments may assign different biological addresses 110 to the different biological region 100 within the body area network 22. The routing policy 80, in other words, may assign network addresses to the different biological region 100 within the body area network 22. Each different biological region 100 may thus be addressable to send/receive communications to/from the communications network 40. When the communications device 34 receives the biological signal 30, the biological signal 30 may again be identified with its particular biological region 100 within the body area network 22. Once the biological region 100 is known, the interface application 52 consults the routing table 82 for the corresponding biological address 110 assigned to the biological region 100. The interface application 52 may then query for the corresponding destination address 84 in the communications network 40, based on the biological region 100 and/or the biological address 110. The interface application 52 may then log the biological signal 30 in the traffic log 94, using the date and time 96 of receipt, the origination biological address 110 (e.g., the biological region 100), and the destination address 84. Once the destination address 84 is selected, the interface application 52 then instructs the processor 50 to direct the biological signal 30 to the retrieved destination address 84.

Figure 9:
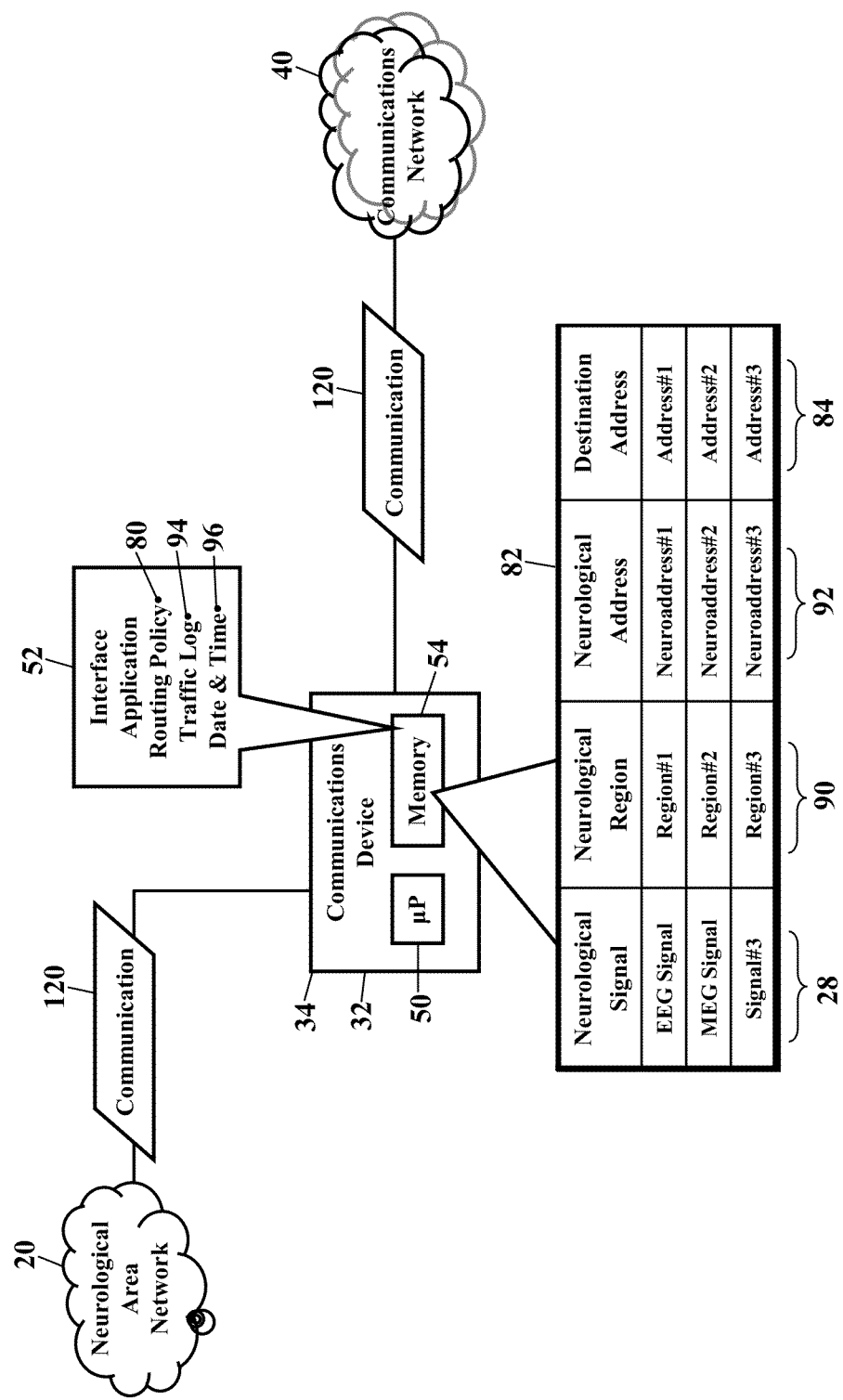
FIGS. 9-10 are schematics illustrating receipt of signals, according to exemplary embodiments.
Figure 10:
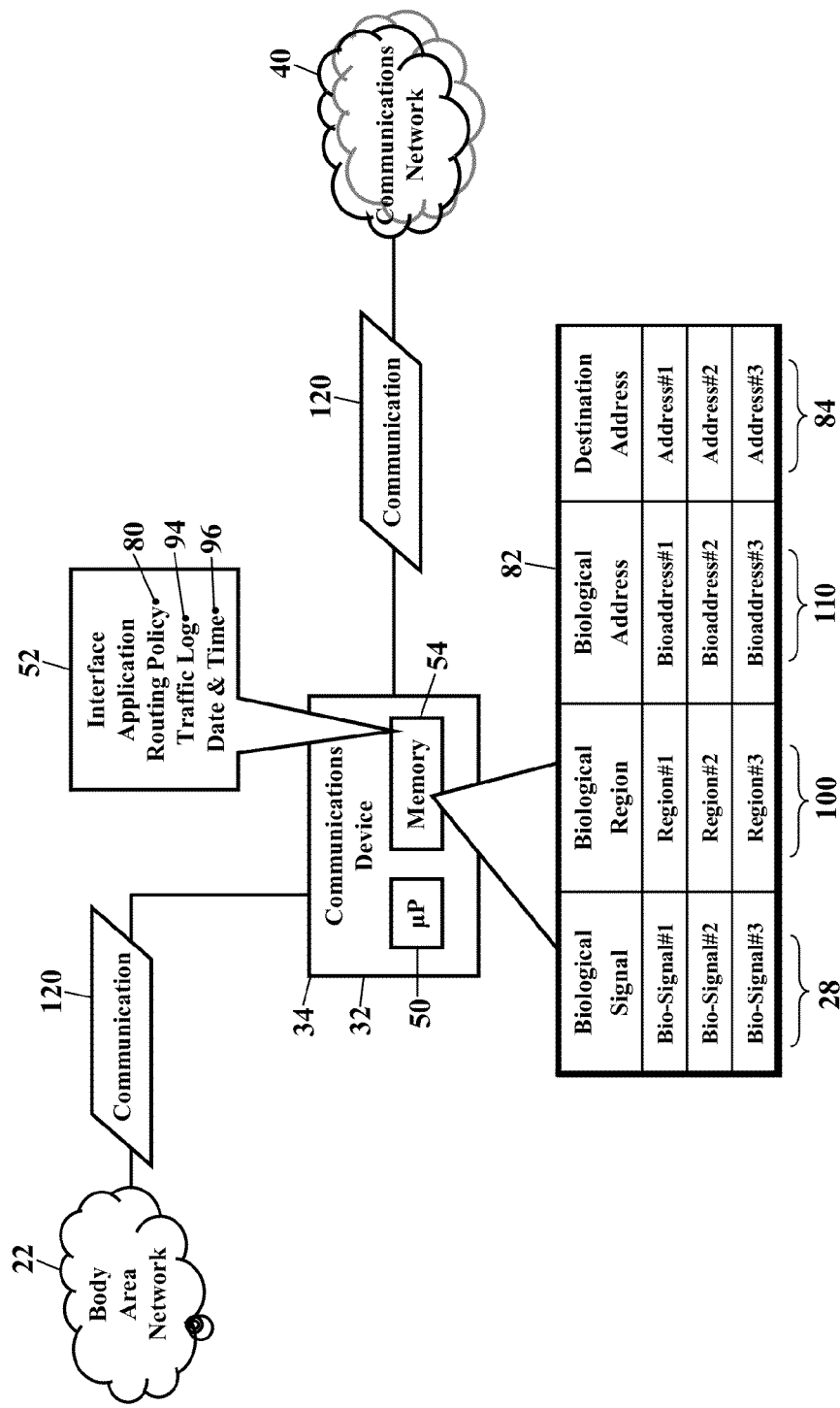

FIGS. 9-10 are schematics illustrating receipt of signals, according to exemplary embodiments. Here the communications device 34 may receive a communication 120 from the communications network 40. The interface application 52 instructs the processor 50 to inspect the communication 120 for its destination. The interface application 52 then instructs the processor 50 to route the communication 120 to the destination.

Here, though, the destination may lie within one of the intrahost networks. The communication 120, for example, may be destination for some location within the neurological area network 20. The communication 120, in other words, may route to some location with the user's brain. The communications device 34 again provides the interface 32 to the neurological area network 20.

FIG. 9 thus illustrates reverse neuroregional translations, according to exemplary embodiments. If the communication 120 is neurologically-related, then the communication 120 should be delivered to the proper neurological region 90. Again, studies have shown that different regions of the brain have different processing capabilities (e.g., the so-called "right brain" and "left brain" activities). In this example the communication 120 is neurologically-related, so the communication 120 may identify its corresponding neurological region 90. That is, the communication 120 contains information or data that identifies its destination neurological region 90. So, when the communication 120 is received, the interface application 52 consults the routing policy 80 and performs a reverse neuroregional translation. The interface application 52 queries the routing policy 80 for the neurological region 90 specified in or by the communication 120. The interface application 52 receives a response that identifies the corresponding neurological address 92 assigned to the neurological region 90. Once the neurological address 92 is known, the interface application 52 then instructs the processor 50 to direct the communication 120 to the retrieved neurological address 92. The communication 120 may be directly sent into the neurological region 90 of the brain (such as by wired or wireless electrode). The communication 120 may also be sent into the neurological area network 20 for natural, neurological routing to the proper neurological region 90 of the brain.

Exemplary embodiments may thus receive and route communications to the brain. Because exemplary embodiments provide the interface 32 to the neurological area network 20, exemplary embodiments may receive and route communications to particular locations within the brain. The communication 120 is received from the external communications network 40 and routed to the proper neurological region 90 of the brain. Exemplary embodiments, in other words, may route communications to addressable locations within the neurological area network 20.

FIG. 10 illustrates reverse bioregional translations, according to exemplary embodiments. Here again the communication 120 is received from the external communications network 40. Here, though, the destination of the communication 120 lies within the body area network 22. The communication 120, in other words, may route to some location within the user's body. In this example the communication 120 may identify its corresponding biological region 100. That is, the communication 120 contains information or data that identifies its destination biological region 100. So, when the communication 120 is received, the interface application 52 consults the routing policy 80 and performs a reverse bioregional translation. The interface application 52 queries the routing policy 80 for the biological region 100 specified in or by the communication 120. The interface application 52 receives a response that identifies the corresponding biological address 110 assigned to the biological region 100. Once the biological address 110 is known, the interface application 52 then instructs the processor 50 to direct the communication 120 to the retrieved biological address 110. The communication 120 may be directly sent into the biological region 100 of the body (such as by wired or wireless electrode). The communication 120 may also be sent into the body area network 22 for natural, biological routing to the proper biological region 100 of the body.

Exemplary embodiments may thus also receive and route communications to the body. Because exemplary embodiments provide the interface 32 to the body area network 22, exemplary embodiments may receive and route communications to particular locations within the body. The communication 120 is received from the external communications network 40 and routed to the proper biological region 100 of the body. Exemplary embodiments, in other words, may route communications to addressable locations within the body area network 22.

Exemplary embodiments may include biological subnets (or "bio-subnets"). The above paragraphs explained that communications may be destined for particular neurological regions 90 within the brain and/or to particular biological region 100 within the body. Because exemplary embodiments provide the interface 32 to these addressable locations, subnetwork notations may be used to denote the neurological regions 90 and the biological regions 100. Exemplary embodiments, in other words, may thus assign biological subnet addresses to existing addressing protocols. Subnet notations may be used by the interface application 52 to ensure addressable routings to the proper logical destinations of neurological and biological communications. The below generic Internet Protocol address (e.g., "IPv6") has a generic subnet IPv6/bitspec,
where the subnet "/bitspec" indicates that a predetermined number of bits in the IPv6 specification may be reserved for bio-subnets. Each neurological region 90 within the brain and/or each biological region 100 within the body may thus be addressable using its particular subnet. So, just as the communications device 34 may have its own unique Internet Protocol address, each neurological region 90 within the brain and/or each biological region 100 within the body may have its own unique Internet Protocol address. In this way signals and communications may be addressably routed to different destinations within the brain and the body.

Figure 11:
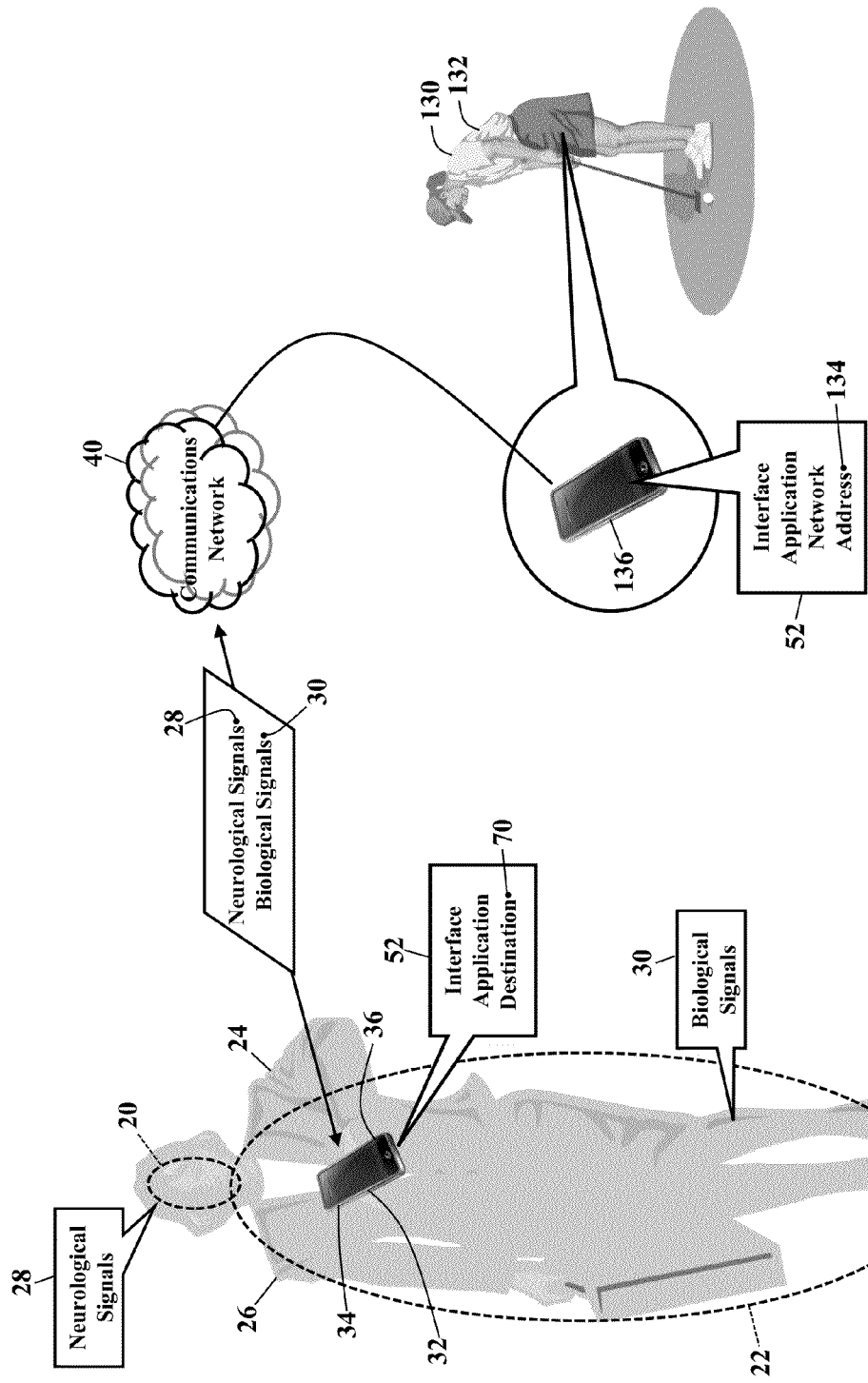
FIG. 11 is a schematic illustrating interhost translation, according to exemplary embodiments.

FIG. 11 is a schematic illustrating interhost translation, according to exemplary embodiments. The above paragraphs explain how the biological host 24 may have short range intrahost networks. That is, the brain of any human or animal has the neurological area network 20 which can be addressable (using the neurological addresses 92 illustrated in FIG. 9). The biological host 24 also has the body area network 22 which may be addressable (using the biological addresses 110 illustrated in FIG. 10). If any biological host 24 has either of these intrahost networks, then communications may be sent between different biological hosts. That is, one person's neurological area network 20 may communicate with a different person's neurological area network 20. Likewise, one person's body area network 22 may communicate with a different person's body area network 22. Indeed, one person's neurological area network 20 may communicate with the different person's body area network 22. As one person's intrahost networks are addressable, different people and animals may conduct interhost communications. In more simple terms, one person's brain may control another person's body and vice-versa.

Each person's communications device 34 may provide the interfacing. As this disclosure explains above, the interface 32 may be needed to communicate electrical signals between the brain, the body, and the external communications network 40. The communications device 34 thus provides the interface 32 between the communications network 40, the neurological area network 20, and the body area network 22. Each person's communications device 34, therefore, may provide the interface 32 to a different person's intrahost networks. That is, one person's communications device 34 may send and receive another person's neurological signals 28 and biological signals 30. Because exemplary embodiments assign network addresses to different regions of the brain and body, communications may be directed between the different regions of different people. In simple terms, exemplary embodiments assign a network address to each different biological host 130.

FIG. 11 thus illustrates interhost translation. When the communications device 34 receives the neurological signals 28 and/or the biological signals 30, the interface application 52 determines the destination 70. Here, though, the destination 70 may be a different biological host 130. If the neurological signals 28 and/or the biological signals 30 are destined for a different person 132, for example, the interface application 52 causes the communications device 34 to route the neurological signals 28 and/or the biological signals 30 into the external communications network 40. The neurological signals 28 and/or the biological signals 30 route along the communications network 40 to a network address 134 associated with a different communications device 136 of the different person 132. The different person's different communications device 136 may also execute the interface application 52. The different communications device 136 may thus route the neurological signals 28 and/or the biological signals 30 to their proper destination within the different person 132, as the above paragraphs explained. The neurological signals 28 and/or the biological signals 30 may thus be routed and exchanged between different people, using their respective communications devices as the interface 32.

Figure 12:
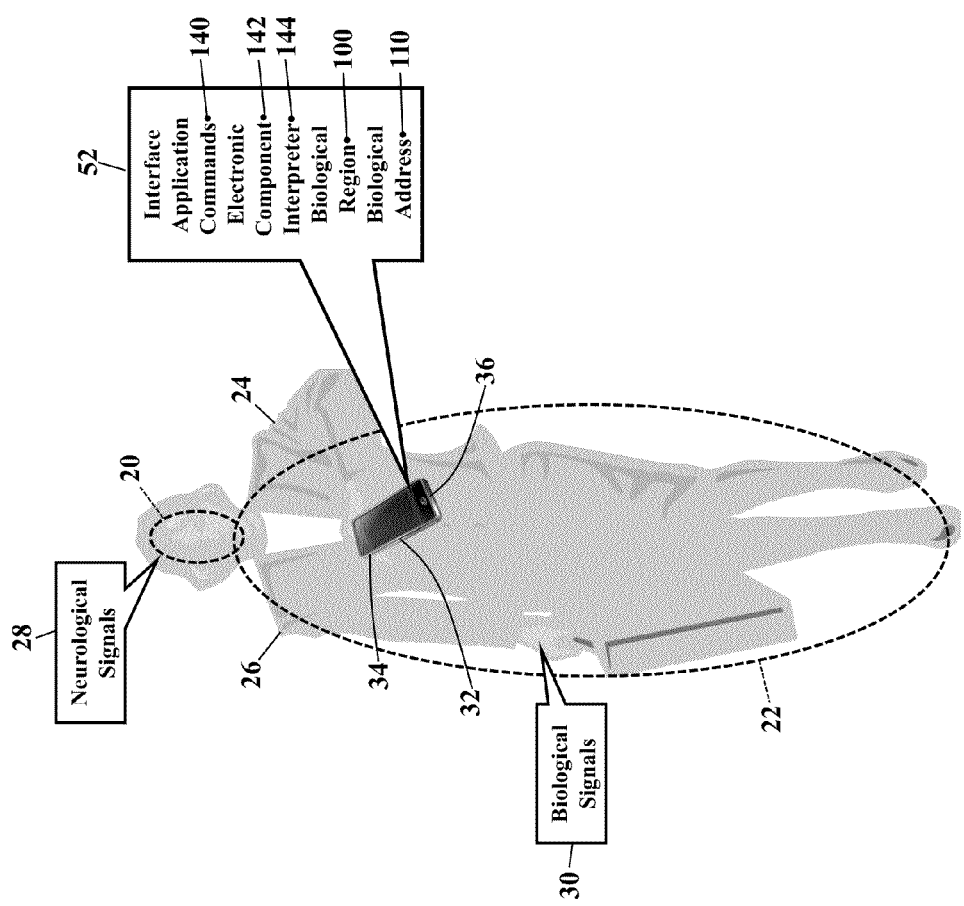
FIGS. 12-13 are schematics illustrating machine translation, according to exemplary embodiments.
Figure 13:
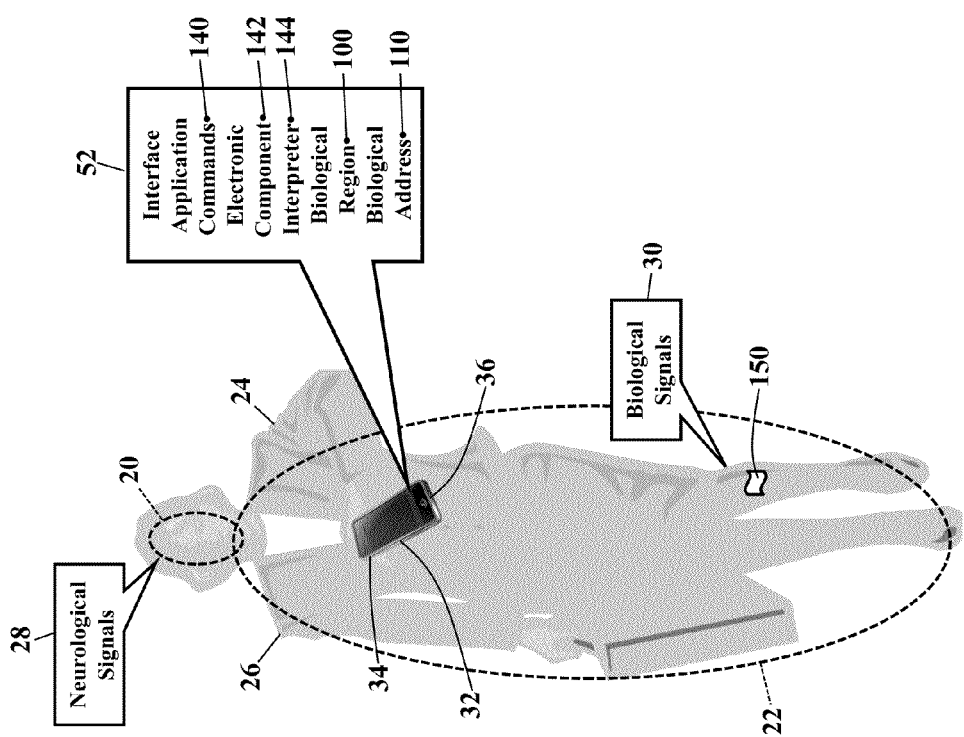
Figure 14:
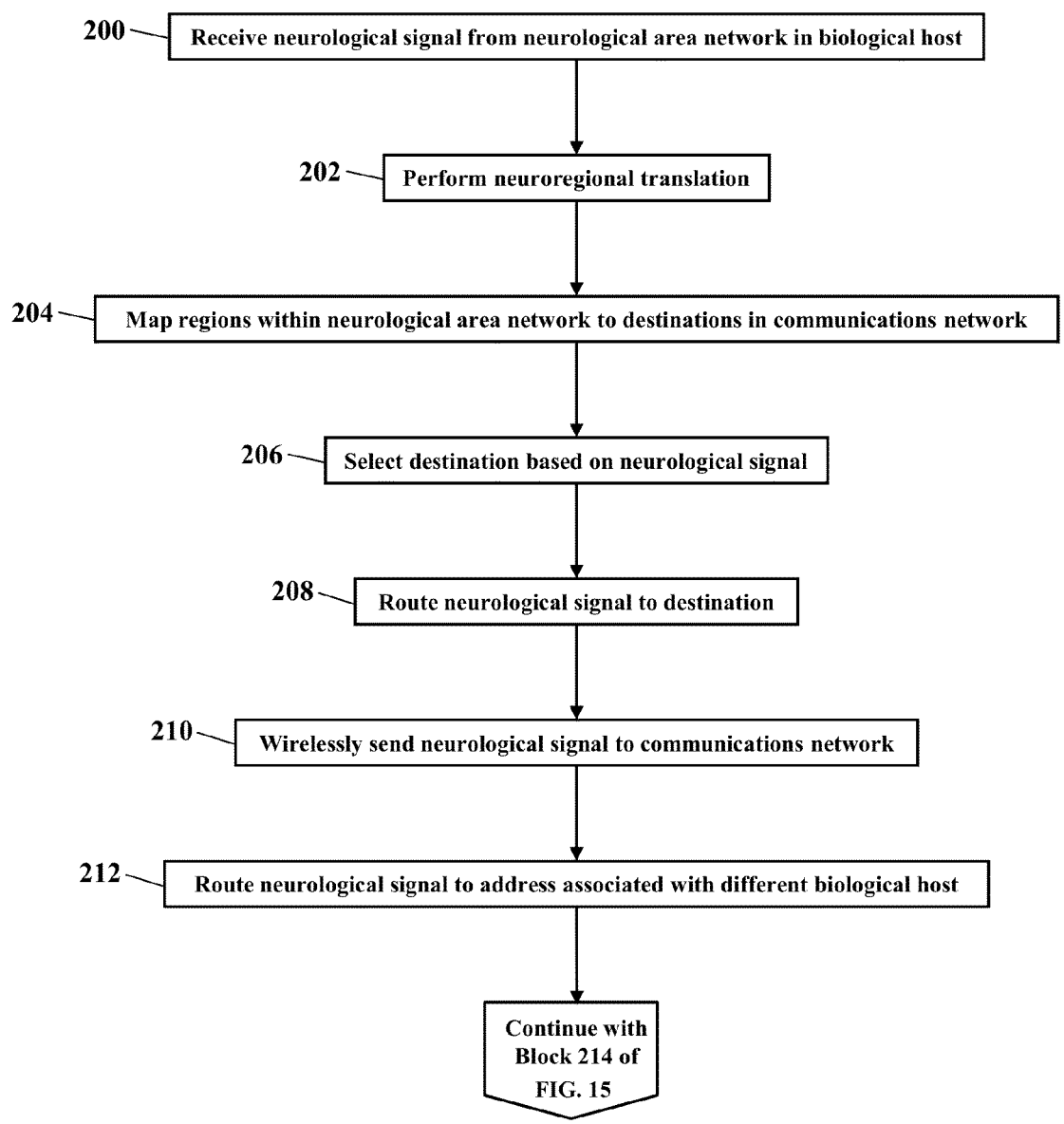
FIG. 14-17 are flowcharts illustrating a method or algorithm for interfacing with neural and body networks, according to exemplary embodiments.

FIGS. 12-13 are schematics illustrating machine translation, according to exemplary embodiments. Here the communications device 34 translates the neurological signals 28 into the biological signals 30. The woman's smart phone 36 again communicates with her neurological area network 20 and her body area network 22. Her smart phone 36 thus receives the neurological signals 28 transmitted from her neurological area network 20. The smart phone 36 interprets the neurological signals 28 and routes the interpretation along the woman's body area network 22.

As this disclosure already explained, though, the brain and body already have very fast communications. The brain and the body already exchange electrical signals. The central nervous system already provides an extremely fast "pipe" for electrical signals transmitted between the brain and the body. For the foreseeable future, it is unlikely that the communications device 34 could provide a better or faster routing process.

The communications device 34, then, may perform machine translation. If the woman's smart phone 36 interprets her neurological signals 28, any interpretation may be unlike existing biological interpretation. That is, the woman's communications device 34 may be used to interpret her neurological signals 28 into machine commands 140 for some electronic component 142. The interface application 52 may thus include an interpreter 144 that translates the neurological signals 28 into the commands 140. The commands 140, for example, may order her communications device 34 to make calls, send text messages, or download content. More interestingly, her neurological signals 28 may be translated into the commands 140 for an artificial heart operating in her own body. Her own thoughts, in other words, may increase or decrease its pumping action. Similarly, a heart pacemaker may be ordered to increase or decrease its rhythm. Controllers in artificial limbs may be instructed to automatically change their parameters. Any electronic component 142 in the woman's body may thus be commanded to change or tune its performance, based on her neurological signals 28 received from the neurological area network 20. The interpreter 144 of the interface application 52 translates the neurological signals 28 into the commands 140. The interface application 52 may then convert the commands 140 into the biological signals 30 that are transmitted along the woman's body area network 22. The biological signals 30 may route to the addressable biological region 100 within the body. Indeed, the biological signals 30 may even route to the biological address 110 associated with the electronic component 142 (such as the heart or hand). The woman may thus be instructed to visualize or think of some parameter change, and the corresponding neurological signals 28 are translated and converted to make physical, operational changes in the electronic component 142. Exemplary embodiments, in other words, may make physical changes using mental thoughts.

The commands 140 may control appliances. The woman's mental thoughts (e.g., the neurological signals 28 received from the neurological area network 20) may be used to control lights, televisions, and even cars. Once the interpreter 144 interprets the neurological signals 28, the interface application 52 may command the communications device 34 itself to take some action. The interface application 52, in other words, may generate the commands 140 for the communications device 34 itself. The woman's brain, for example, may think "call Bob," and her neurological signals 28 are translated into dialing commands 140 for the communications device 34. The woman may, likewise, visualize text to be sent to "Bob," and her neurological signals 28 are translated into the commands 140 that send a text message to Bob. Any neurological signals 28 may be interpreted as the commands 140 for channel changes, lights, music players, and appliances.

FIG. 13 further illustrates machine translation. Here the woman's thoughts may control a changeable tattoo 150. The tattoo 150 is another example of physical response to mental thoughts. The tattoo 150 is capable of changing its visual appearance in response to the neurological signals 28 received from the neurological area network 20. That is, the tattoo 150 changes in response to the woman's thoughts. The woman thinks about the visual appearance of her tattoo 150. Her neurological signals 28 are received by her smart phone 36. The interpreter 144 of the interface application 52 translates the neurological signals 28 into the commands 140 for her tattoo 150. The interface application 52 converts the commands 140 into the biological signals 30, and the biological signals 30 are transmitted along the woman's body area network 22. The biological signals 30 route to the addressable biological region 100 within the body that contains her changeable tattoo 150. The tattoo 150 is thus commanded to change its visual appearance. The woman merely visualizes the appearance of her tattoo 150, and her thoughts are interpreted into physical changes of her tattoo 150.

The changeable tattoo 150, however, may respond to the commands 140 that originate from the interface application 52. The interface application 52, in other words, may itself determine what the tattoo 150 displays. So, whether the user mentally instructs the tattoo 150, or the interface application 52 issues the commands 140, the tattoo 150 may respond to the commands 140 regardless of origination.

An example helps explain the changeable tattoo 150. Because the tattoo 150 may be instructed to change its appearance by the interface application 52, the tattoo 150 may be considered a biological display device. The tattoo 150, in other words, may be instructed to display any information, logo, text, or output. The tattoo 150 may also dynamically change its visual appearance as fast as the body area network 22 may process and deliver the biological signals 30. The interface application 52, for example, may retrieve an airline boarding pass from its memory 54 and then command the tattoo 150 to display the airline boarding pass. The interface application 52 may also retrieve a photo ID from its memory 54 and command the tattoo 150 to simultaneously display both the airline boarding pass and the photo ID. No physical documents are thus needed to pass airline security.

The changeable tattoo 150 has many other uses. The tattoo 150 may be commanded to display a reminder at a particular date and time, thus helping the user remember important calendar events. The tattoo 150 may be commanded to display web pages, movies, advertisements, or any other content. The tattoo 150 may be commanded to display authentication credentials (such as images and passwords) that unlock a car or provide access to a computer or hotel room. The tattoo 150 may display moods of the user with appropriate colors (e.g., red for "anger" or "blue" for sadness) or images (smiley/sad faces).

The changeable tattoo 150 may also be used in commerce. Because the tattoo 150 may be commanded to display content, the tattoo 150 may display advertising. Just as spam email or text messaging exists, the communications device 34 may receive spam advertising communications for display by the tattoo 150. Users may thus opt-in or opt-out of this "spam tattooing." Users may establish white lists of approved advertisers and black lists of denied advertisers. The tattoo 150 may display account information, thus allowing the user to make purchases and debit accounts by displaying machine readable account information (such as bar codes).

The tattoo 150 may even respond to the neurological signals 28 of different biological hosts. As earlier paragraphs explained, the interface 32 may exchange neurological signals 28 and biological signals 30 between different biological hosts. Different people, in other words, may exchange their mental and physical signals. When the interface application 52 receives a different person's neurological signals 28, the interface application 52 may translate the different person's neurological signals 28 into the commands 140 for the woman's own tattoo 150. The interface application 52, in other words, may instruct the tattoo 150 to display another person's thoughts. Some people, of course, will want complete control over their own tattoo 150, while other users may enjoy expressing the thoughts of others. Users may thus opt-in or opt-out of this exogenous tattooing. Users may thus establish white lists of approved people or addresses and black lists of denied people or addresses. Purchasing permissions may be given by adults to children by displaying a machine readable permission code. Parents may thus give authorization for purchases simply by changing the child's tattoo 150.

The tattoo 150 may also communicate with external systems. Because the tattoo 150 displays any image or text, the visual appearance of the tattoo 150 may be interpreted by sensors. A vision system camera, for example, may be trained or aimed to capture the images and/or text displayed by the tattoo 150. The images and/or text may then be interpreted by a computer or server. Once the images and/or text are interpreted, actions may be based on the interpretation. The communication 110, for example, may be sent back to the woman's smart phone 36 as a response to the interpretation. The interface application 52 may then interpret and route the incoming communication 110, as earlier paragraphs explained. Exemplary embodiments, then, may provide a back-up or redundant path for communications with the brain's cerebral cortex.

FIG. 14-17 are flowcharts illustrating a method or algorithm for interfacing with neural and body networks, according to exemplary embodiments. A neurological signal is received from a neurological area network in a biological host (Block 200). A neuroregional translation is performed (Block 202). Regions within the neurological area network may be mapped to different destinations in a communications network (Block 204). A destination may be selected based on a region in the neurological area network based on the neurological signal (Block 206). The neurological signal is routed to the destination (Block 208). The neurological signal may be wirelessly sent to a wireless communications network (Block 210) and routed to an address associated with a different biological host (Block 212).

Figure 15:
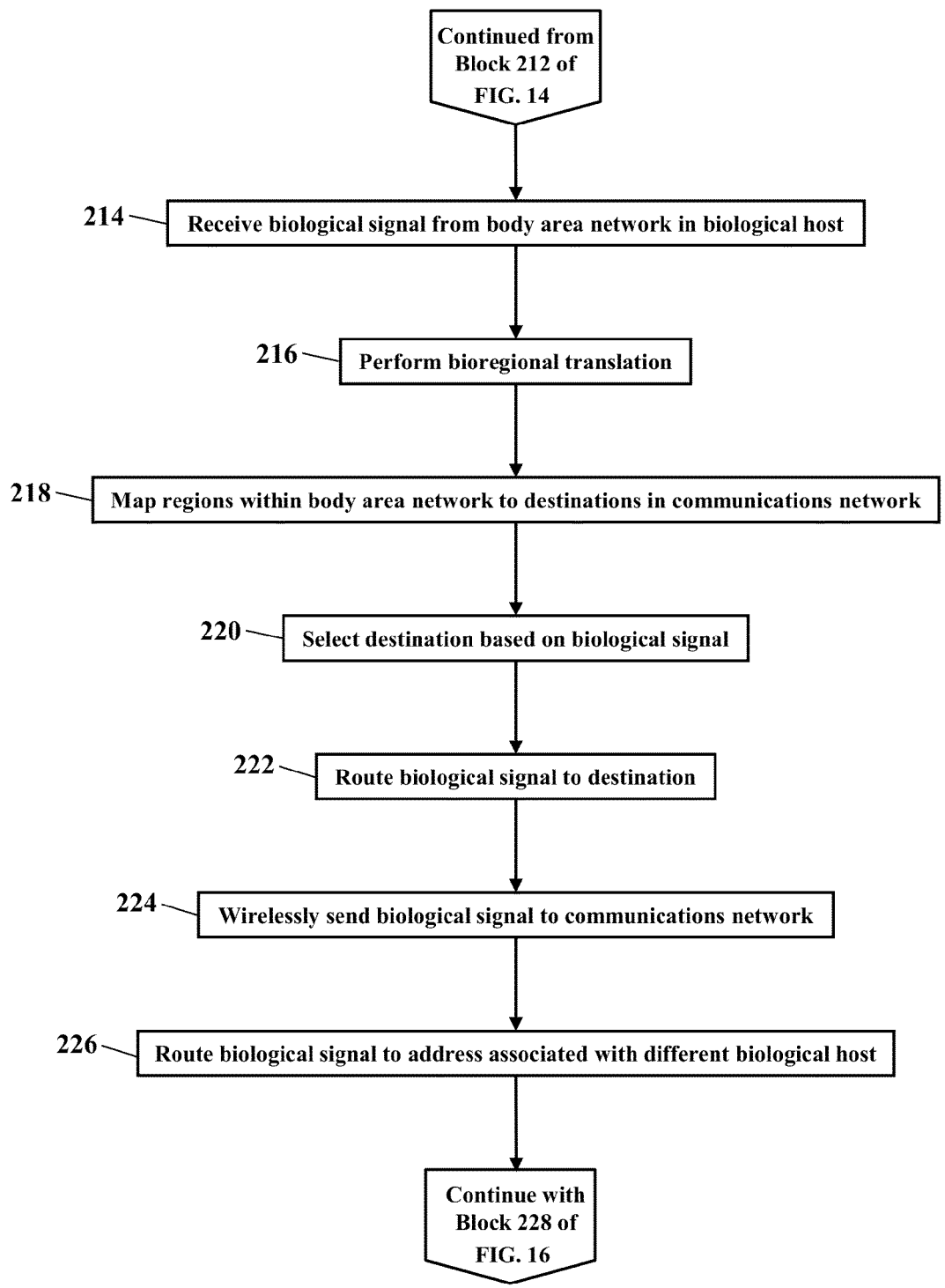

The algorithm continues with FIG. 15. A biological signal may also be received from a body area network in the biological host (Block 214). A bioregional translation is performed (Block 216). Regions within the body area network may be mapped to different destinations in a communications network (Block 218). A destination may be selected based on a region in the body area network based on the neurological signal (Block 220). The biological signal is routed to the destination (Block 222). The biological signal may be wirelessly sent to a wireless communications network (Block 224) and routed to an address associated with a different biological host (Block 226).

Figure 16:
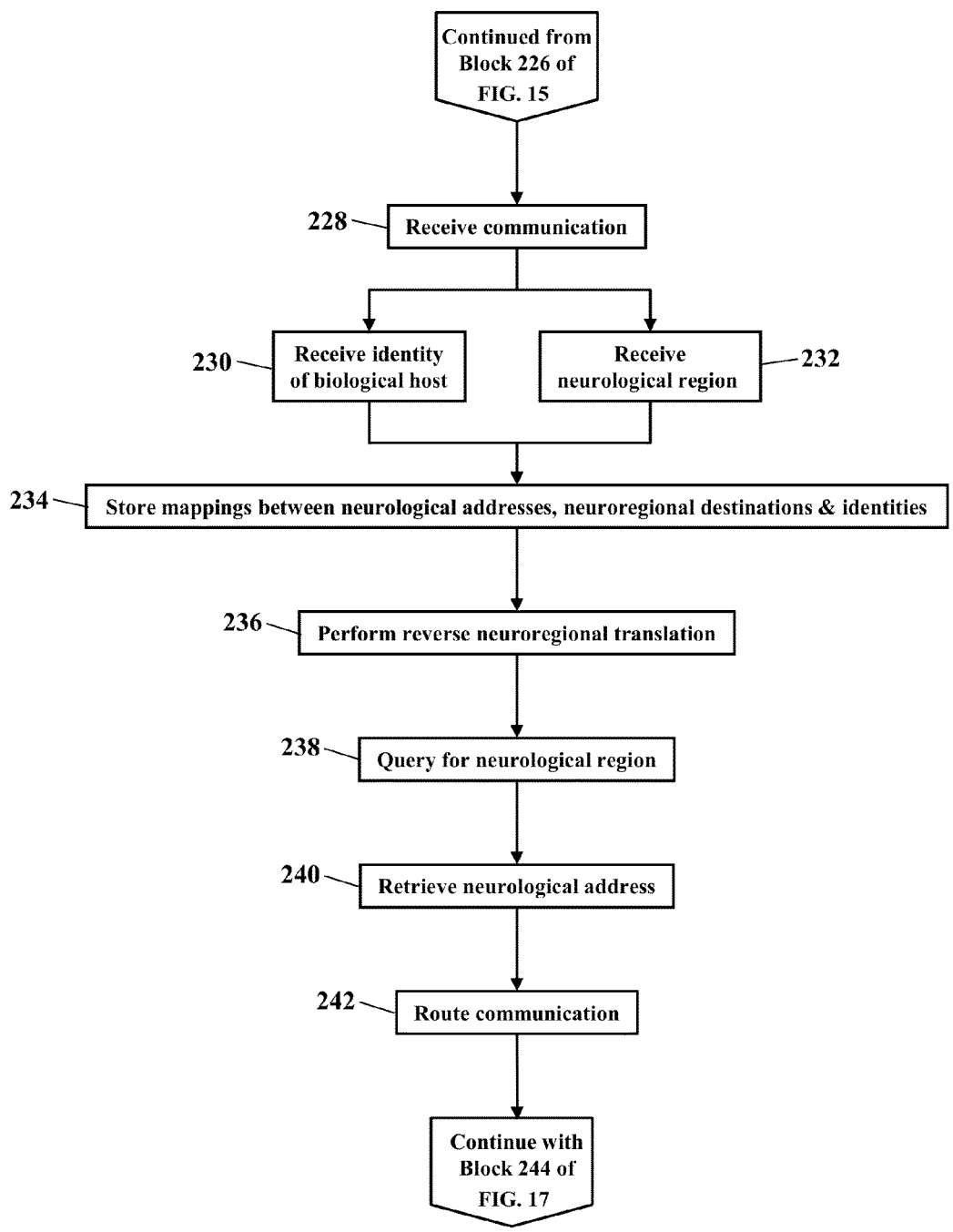

The algorithm continues with FIG. 16. A communication is received (Block 228). The communication may be associated with an identity of the biological host (Block 230) and/or a neurological region in the neurological area network (Block 232). Logical mappings are stored between neurological addresses, neuroregional destinations in the neurological area network, and identities of different biological hosts (Block 234). A reverse neuroregional translation is performed (Block 236). A query is made for the neurological region associated with the communication (Block 238). The corresponding neurological address is retrieved (Block 240). The communication is routed to the neurological address (Block 242).

Figure 17:
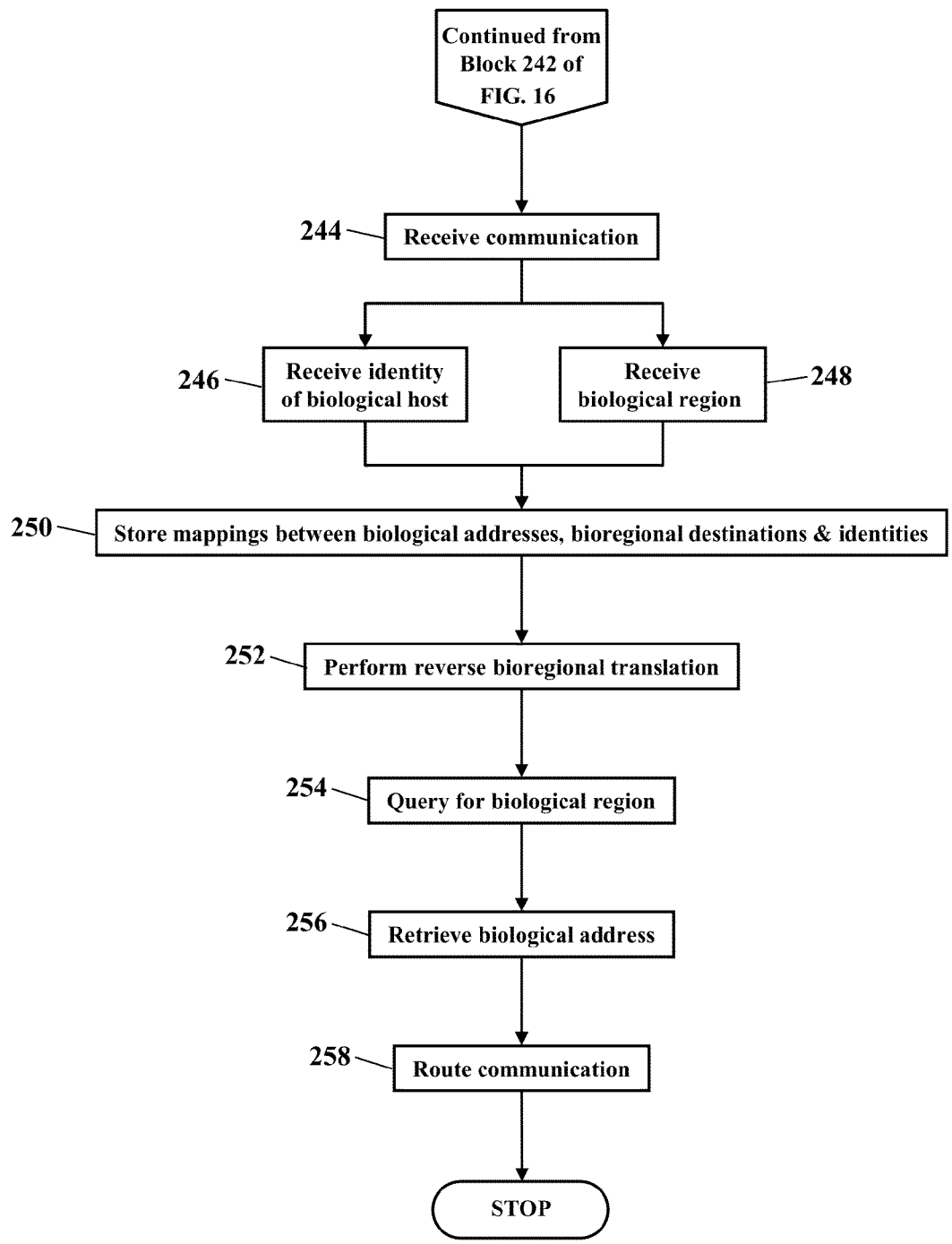

The algorithm continues with FIG. 17. A communication is received (Block 244) that is associated with an identity of the biological host (Block 246) and/or a biological region in the body area network (Block 248). Logical mappings are stored between biological addresses, bioregional destinations in the body area network, and identities of different biological hosts (Block 250). A reverse bioregional translation is performed (Block 252). A query is made for the biological region associated with the communication (Block 254). The corresponding biological address is retrieved (Block 256). The communication is routed to the biological address (Block 258).

Figure 18:
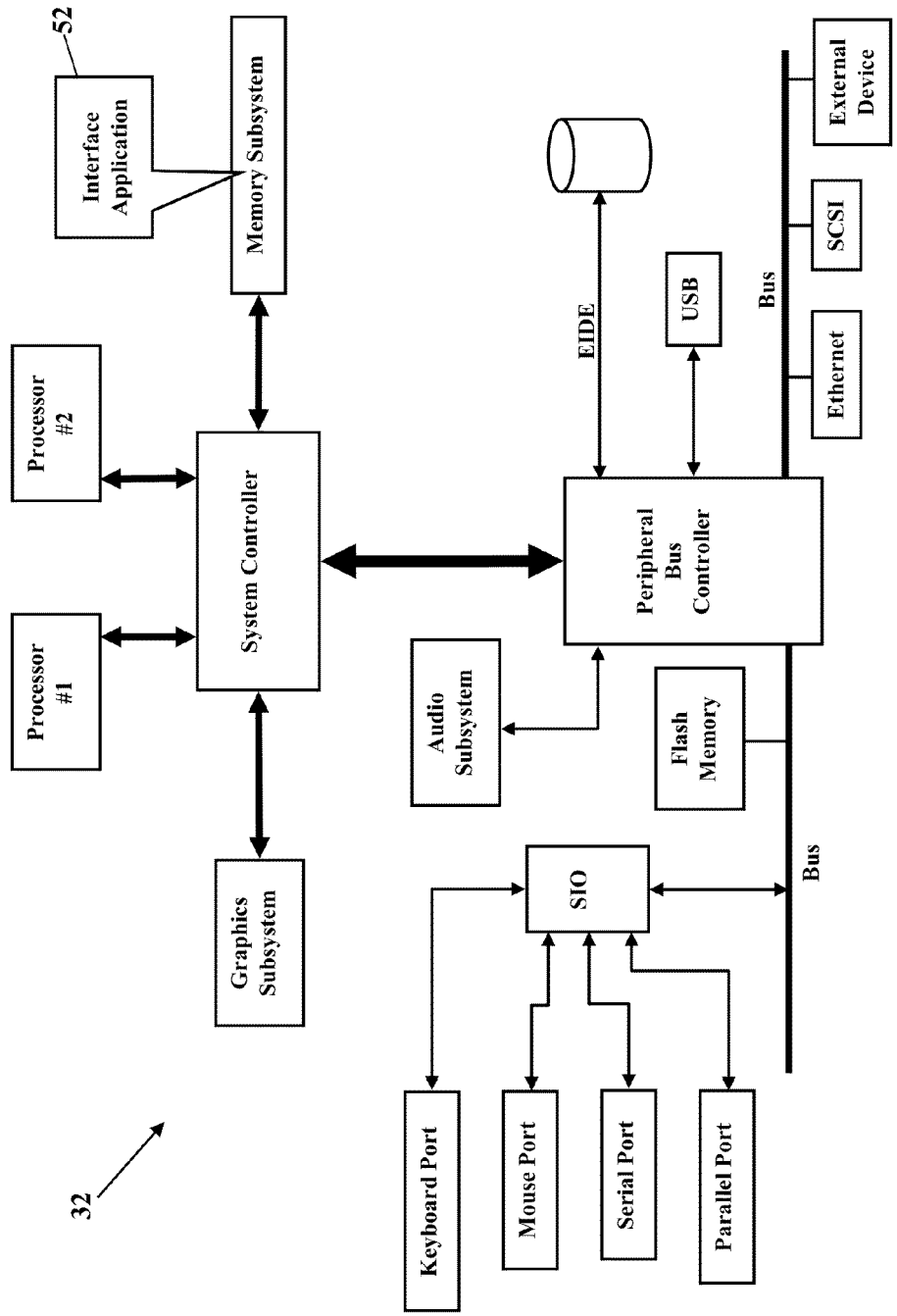
FIGS. 18-19 depict still more operating environments for additional aspects of the exemplary embodiments.

FIG. 18 is a schematic illustrating still more exemplary embodiments. FIG. 18 is a more detailed diagram illustrating the interface 32. As earlier paragraphs explained, the interface 32 may be any processor-controlled device. FIG. 18, then, illustrates the interface application 52 stored in a memory subsystem of the processor-controlled interface 32. One or more processors communicate with the memory subsystem and execute the interface application 52. Because the processor-controlled interface 32 illustrated in FIG. 29 is well-known to those of ordinary skill in the art, no further explanation is needed.

Figure 19:
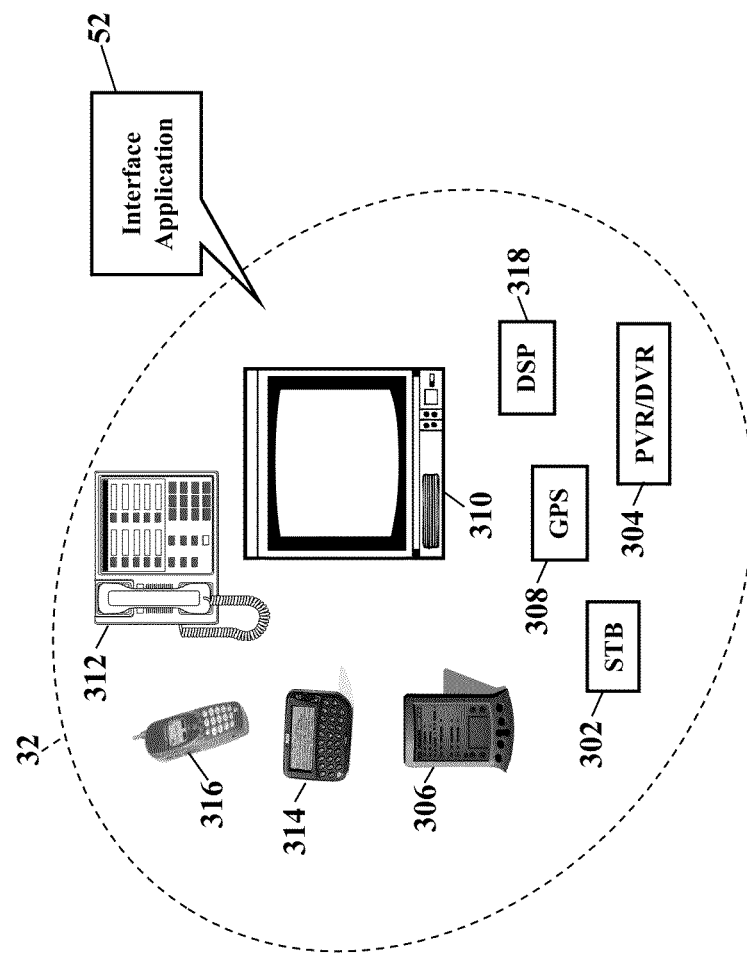

FIG. 19 depicts still more operating environments for additional aspects of the exemplary embodiments. FIG. 19 illustrates that the exemplary embodiments may alternatively or additionally operate within other processor-controlled interfaces 32. FIG. 19, for example, illustrates that the interface application 52 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or any processor-controlled device utilizing a digital signal processor (DP/DSP) 318. The interface 32 may also include watches, radios, vehicle electronics, clocks, printers, gateways, mobile/implantable medical devices, and other apparatuses and systems. Because the architecture and operating principles of the various processor-controlled interfaces 32 are well known, the hardware and software componentry of the various processor-controlled interfaces 32 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises processor-executable instructions for interfacing with neurological area and body area networks, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A system, comprising:
a processor; and
a memory storing code that when executed causes the processor to perform operations, the operations comprising:
receiving a neurological signal from a neurological area network in a biological host;
executing a routing policy that associates the neurological signal to a destination network address; and
routing the neurological signal to the destination network address.

2. The system of claim 1, wherein the operations further comprise mapping regions within the neurological area network to different network destinations in a communications network.

3. The system of claim 2, wherein the operations further comprise selecting one of the different network destinations based on a region in the neurological area network from which the neurological signal was received.

4. The system of claim 2, wherein the operations further comprise selecting one of the different network destinations based on a region in the neurological area network associated with the neurological signal.

5. The system of claim 1, wherein the operations further comprise perform a reverse neuroregional translation.

6. The system of claim 1, wherein the operations further comprise wirelessly send the neurological signal to the destination network address in a wireless communications network.

7. The system of claim 1, wherein the operations further comprise routing the neurological signal to an Internet protocol address associated with a different biological host.

8. A method, comprising:
assigning, by a processor, a neurological address to a neurological destination in a neurological area network of a biological host;
storing, in memory, an association between the neurological address and an identity of the biological host;
receiving, by the processor, a communication associated with the identity of the biological host;
querying the memory for the identity of the biological host;
retrieving, from the memory, the neurological address; and
routing, by the processor, the communication to the neurological address associated with the identity of the biological host.

9. The method of claim 8, further comprising storing associations between different biological addresses and different biological destinations in the biological host.

10. The method of claim 9, further comprising routing the communication to one of the different biological addresses associated with the identity of the biological host.

11. The method of claim 10, further comprising assigning a bio-subnet to the neurological area network.

12. The method of claim 8, further comprising performing a reverse neuroregional translation.

13. The method of according to claim 8, further comprising routing the communication to an addresses associated with a different biological host.

14. The method of claim 8, further comprising routing a neurological signal from the neurological address to a destination address in a wireless network.

15. A memory storing instructions that when executed cause a processor to perform operations, the operations comprising:
- assigning a neurological address to a neurological destination in a neurological area network of a biological host;
- storing an association between the neurological address and an identity of the biological host;
- receiving a communication associated with the identity of the biological host;
- querying for the identity of the biological host;
- retrieving the neurological address; and
- routing the communication to the neurological address associated with the identity of the biological host.

16. The memory of claim 15, wherein the operations further comprise storing associations between different biological addresses and different biological destinations in the biological host.

17. The memory of claim 16, wherein the operations further comprise routing the communication to one of the different biological addresses associated with the identity of the biological host.

18. The memory of claim 17, wherein the operations further comprise performing a reverse neuroregional translation.

19. The memory of claim 15, wherein the operations further comprise assigning a bio-subnet to the neurological area network.

20. The memory of claim 15, wherein the operations further comprise routing a neurological signal from the neurological address to a destination address in a wireless network.

\* \* \* \* \*